G. DE LAVAL.
LATHE.
APPLICATION FILED AUG. 29, 1916.
1,240,032.
Patented Sept. 11, 1917.
2 SHEETS—SHEET 1.
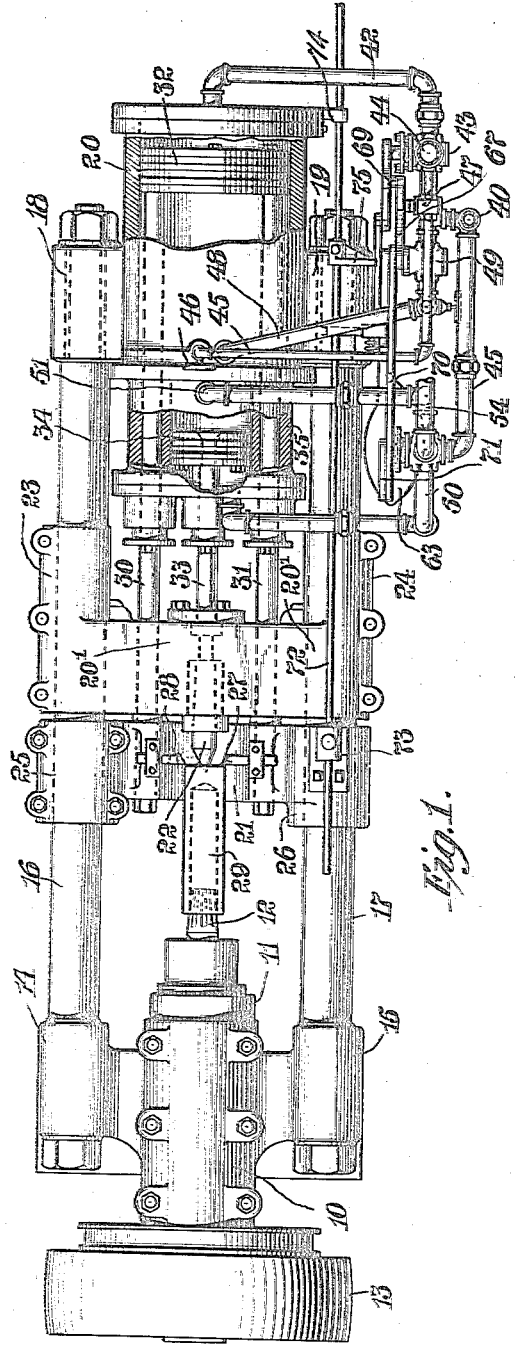
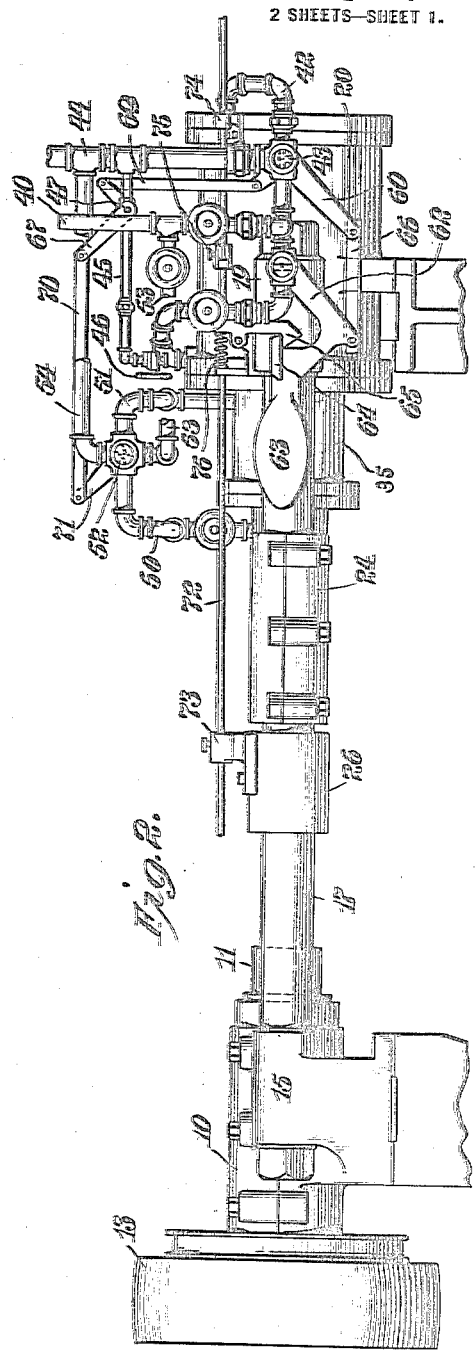
INVENTOR.
George de Laval
BY
HIS ATTORNEY INVENTOR.
George de Laval
BY
HIS ATTORNEY

UNITED STATES PATENT OFFICE.

GEORGE DE LAVAL, OF ORANGE, NEW JERSEY, ASSIGNOR TO THE T. A. GILLESPIE COMPANY, OF NEW YORK, N. Y., A CORPORATION OF DELAWARE.

LATHE.

1,240,032.   Specification of Letters Patent.   Patented Sept. 11, 1917.

Application filed August 29, 1916. Serial No. 117,402.

*To all whom it may concern:*

Be it known that I, GEORGE DE LAVAL, a citizen of the United States, and a resident of Orange, county of Essex, State of New Jersey, have invented certain new and useful Improvements in Lathes, of which the following is a specification.

This invention relates to machines for working metals or other materials, and particularly one for turning or otherwise operating on the exterior of the work, and more particularly, for such a machine in which the tool carriage and also a suitable work support, are moved by fluid pressure.

One of the objects of the invention is to provide a machine capable of giving a high rate of production and which is substantially automatic in its operation, and which, at the same time, shall be inexpensive to build and maintain.

Another object of the invention is to provide means by which the work may be held in place by fluid pressure.

Another object of the invention is to provide a means by which a tool can be fed along the work by fluid pressure at a rate which can be readily controlled by the operator.

Another object of the invention is to provide a fluid operated feed for the work support and the tool which will return the parts automatically to their initial position when the work of the operation is completed.

With these and other objects in view, my invention consists of certain novel features of construction, combination and arrangement of parts, as will be more fully described and pointed out in the appended claims.

In the drawings, Figure 1 is a plan, and Fig. 2 a side elevation of the particular type of machine which I have chosen for purposes of illustration, some of the parts being broken away;

The corresponding parts are referred to both in the drawings and in the specification by similar reference characters.

Figure 3:
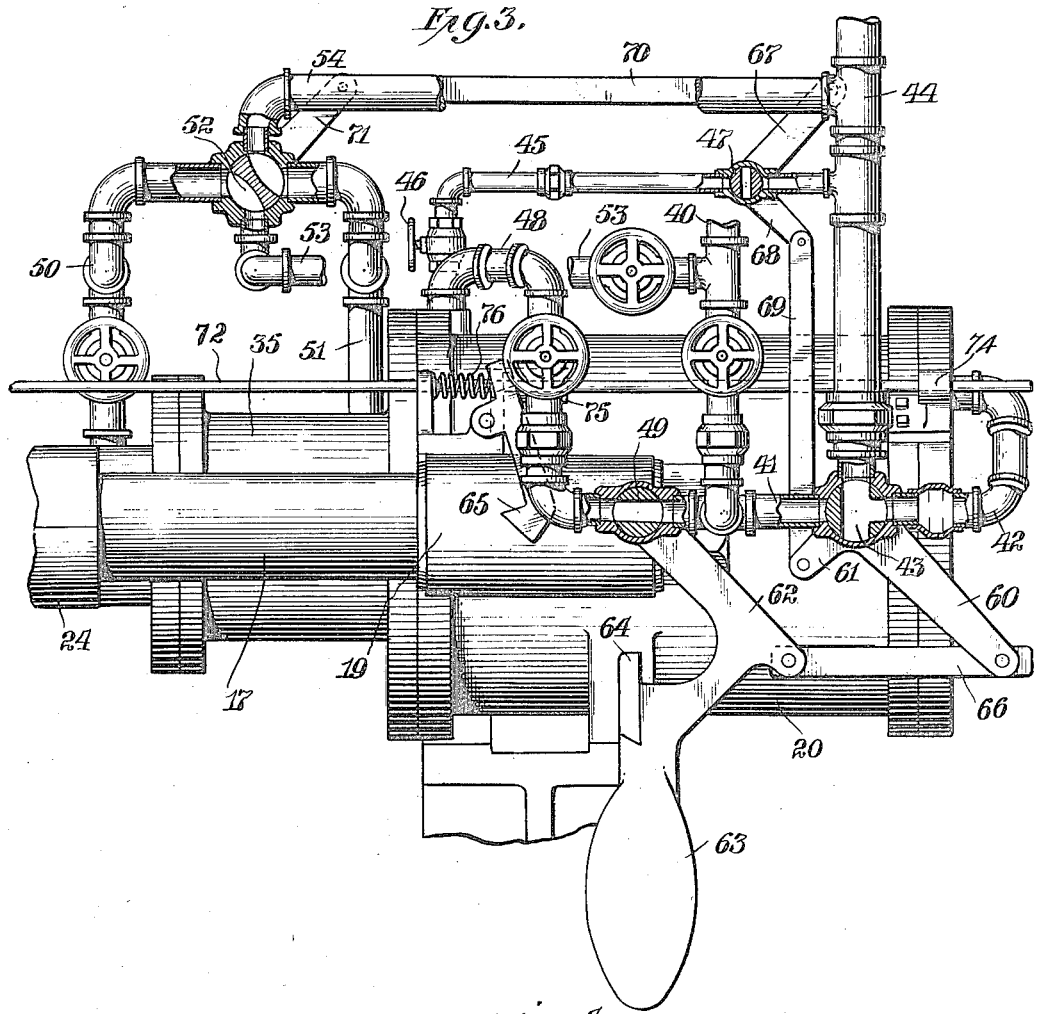
Fig. 3 is an enlarged view, with some of the parts broken away, showing the operation of the valves for feeding the tool carriage and work center.

In the drawings 10 is a live spindle bearing having a spindle 11 and carrying a work driver 12. To one end of the spindle 11 is attached a pulley 13 driven by any suitable means to rotate the driver 12. A pair of lugs 14, 15 are cast integral with the spindle bearing 10 and in these lugs are held rigidly a pair of rods 16, 17.

The other ends of these rods 16, 17 are held in lugs 18, 19 cast integral with the hydraulic cylinder 20. The rods 16 and 17 are held in the lugs 14, 15 and 18, 19 so that any motion between the cylinder 20 and the spindle bearing 10 is prevented.

The rods 16, 17 serve as ways for a work center support 20' and a tool carriage 21. The work center support 20' has a work center 22 of the usual type and the support 20' is provided with bearings 23, 24 engaging the rods 16, 17.

The tool carriage 21 has bearings 25, 26 engaging the rods 16, 17. This carriage is provided with any suitable tool supports, and I have shown for illustrative purposes a pair of lathe tools 27, 28, fastened in any suitable manner to seats on the tool carriage 21. It will be understood that the character of the tools carried by the tool carriage and the means for supporting such tools on the carriage may be varied within wide limits.

It will also be understood that while I have shown the ordinary work center 22, any suitable means for supporting the end of the work to be operated on, may be substituted therefor. The machine illustrated operates as a lathe to turn the work 29, which in this instance, has been previously drilled, and accordingly the work driver 12 is provided with teeth cut on a tapered surface which tend not only to center the work 29, but also to engage it sufficiently to rotate it against the pressure of the cutting tools 27, 28.

Preferably I feed the work carriage 21 along the piece to be turned by fluid pressure, and to this end I provide a pair of rods 30, 31, connected to the carriage 21, passing through suitable openings in the work center carriage 20'. At the opposite end these rods are provided with a piston 32 working in the cylinder 20.

I also preferably provide a fluid pressure means for operating the work center carriage, and to this end I connect a rod 33 with the carriage, this rod being provided at its opposite end with a piston 34 working in a cylinder 35 formed in the machine illustrated on the end of the cylinder 20, but not in communication therewith.

In my preferred form I provide a fluid pressure supply pipe 40 communicating through the pipes 41 and 42 by means of a three way valve 43 to the rear or right hand end in Figs. 1 and 3, of cylinder 20. The valve 43 is arranged so that communication between pipe 42 and a waste pipe 44 may be obtained. From the front or left hand end of the cylinder 20 leads an outlet pipe 45 provided with a hand operated valve 46 and a valve 47, the pipe 45 leading to the waste pipe 44. Also connected to the front, or left hand end of the cylinder 20, is a pipe 48 provided with a valve 49 and connecting with the feed pipe 40. The pipes so far described serve to move the piston 32 to operate the tool carriage 21, and this operation is controlled by the valves in a manner to be hereinafter described.

For the purpose of operating the piston 34 I provide a pipe 50 communicating with the front or left hand end of the cylinder 35 and a pipe 51 communicating with the rear or right hand end of that cylinder. These two pipes communicate by a four way valve 52 with an inlet pipe 53 connected to the supply pipe 40 and with an outlet pipe 54 connected to the waste pipe 44.

The valves 43, 47, 49 and 52 are preferably connected together to be operated simultaneously and automatically. In the position shown in Figs. 1 and 2, the valves are shown in the position which they would be shortly after the pressure is turned on to bring the work center in contact with the work, and to begin the feeding movement of the tool carriage. To this end valve 52 has been turned so as to connect the supply pipe 40 with the pipe 51 to force the piston 34 forward and thus bring the center 22 into contact with the work and to hold it there. In this operation the pipe 50 connected to the front end of the cylinder has been opened to the waste pipe 44 through the four way valve 52 to permit the fluid to pass from the front of the piston 34 as it moves forward.

In order to move the carriage 21 forward, the valve 43 is turned so that the pipe 42 is connected to the supply pipe 40, and, at the same time, the valve 47 is opened to permit fluid to pass from the front of the cylinder into the waste pipe 44 and the valve 49 has been closed to close the passage from the supply pipe 40 with the front end of the cylinder.

The valve 46 is set so as to regulate the rate of the forward feed of the tool carriage 21, it being obvious that the piston 32 cannot move forward under a given pressure through the pipe 42 at any faster rate than the fluid can pass from the front of the piston 32 into the waste pipe 44.

The valve 43 is provided with a bell crank having an arm 60 and an arm 61. The valve 49 is provided with a lever 62 provided with a handle 63 and a catch piece 64, this catch piece being adapted to engage with the hook end of the hook lever 65. A link 66 connects arms 62 and 60. Similarly the valve 47 is provided with a bell crank having arms 67, 68, the latter being connected through a link 69 with the arm 61. The arm 67 is connected through a link 70 with an arm 71 connected to the valve 52. It will be clear from an inspection of Figs. 2 and 3 that as the handle 63 is swung from the position shown in Fig. 2 to that shown in Fig. 3, the position of all of the valves will be reversed.

Preferably I provide automatic means for this reversal of the positions of the valves, and to that end I have provided a rod 72 connected to a bracket 73 attached to a bearing 26 of the tool carriage 21. The other end of this rod 72 is supported in any suitable bracket as 74. On the bracket 72 is a tappet or finger 75 which is set on the rod 72 at a suitable distance to strike the upper end of the hook lever 65 when the tools on the tool carriage have reached the end of the desired feed motion. This striking compresses the spring 76 which normally holds the hook lever 65 in the position shown in Fig. 2 and moves that lever into the position shown in Fig. 3. The catch piece 64 is thus released and the weight of the arm 63 swings the lever 62 into the position shown in Fig. 3, thus setting the valves in the positions shown in that figure. When so set, it will be seen that the rear of the cylinder 20 is open to the waste pipe and the front of the cylinder is open to the feed pipe 40. The fluid therefore passes into the front of the cylinder and out of the rear, forcing the piston 32 to the right and thus drawing back the work carriage to its original position. During this operation the valve 47 is closed to prevent the waste of the fluid entering the front of the cylinder. At the same time the rear of the cylinder 35 is open to the waste pipe 44 and the front is open to the supply pipe 40 so that the piston 34 is also moved to the right, thus drawing the work center away from the work and releasing the same.

Suitable valves are provided, as shown, for the purpose of regulating the relative rates of flow of fluid through the various pipes so that the two carriages can be moved relatively at whatever rate the operator elects.

Figure 4:
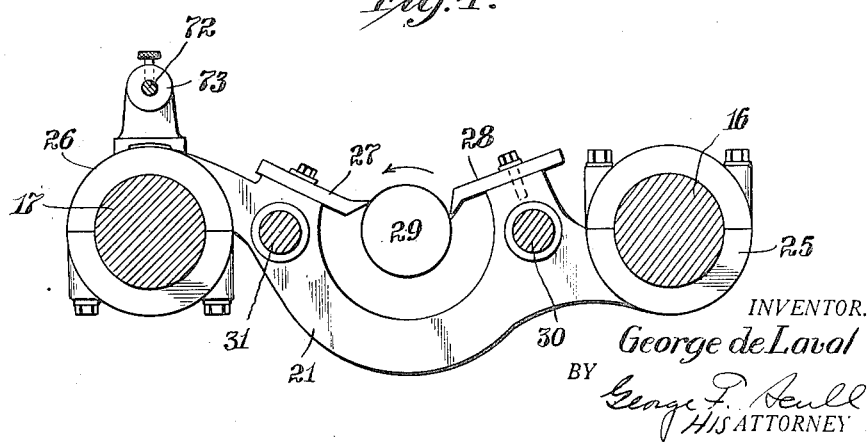
Fig. 4 is a cross section through the machine showing the construction of the tool carriage.

Preferably I make my tool carriage 21 in the form shown in Fig. 4, in which the caps of the bearings are placd in such a manner that the solid portion of such bearings which are cast integral with the carriage itself, carries the rotating pressure of the cutting tools. As will be seen by an inspection of Fig. 4, assuming that the work is rotated in the direction of the arrow, the solid portions of the bearings will be thrust against the rods 16 and 17 so that the caps, and therefore the bolts of such bearings, will have no pressure due to the cutting torque.

While I have shown my tool carriage and work support carriage as each operated by fluid pressure, it will be understood that it is not essential that both should be so operated, and while I have shown the valves for operating these carriages as connected up to be operated automatically, it should be understood that they could be operated independently, if so desired.

While the particular arrangement of valves and piping which I have chosen for purposes of illustration is my preferred form, it is obvious that such piping and valves may be varied within the scope of the claims.

Preferably I arrange my cylinders in tandem, as shown, for by such means I provide a compact arrangement and at the same time one which produces a minimum amount of distortion on the bearings of the two carriages. The rods 16 and 17 provide rigid means by which the strains of cutting will be overcome by direct attention to any distortion. By regulating the pressure of the fluid supplied to the piston 34, I provide a work center operating means which will invariably supply and maintain a predetermined amount of pressure on the work and this I find a great improvement over the ordinary means for operating such a dead center in which the workman is liable to supply a varying pressure with successive pieces of work.

I claim:

1. In a machine of the class described, a work center and fluid operated means to move it toward and hold it against the work, a tool carriage and means controlled by the motion of said carriage to withdraw said center from the work.

2. In a machine of the class described, a work center, a fluid operated piston connected thereto, means to supply a fluid pressure behind said piston to move said center toward the work, means to supply a fluid pressure to the front of said piston to move said center away from the work, a tool carriage and means operated by the motion of said carriage to control the operation of said last named means at predetermined times.

3. In a machine of the class described, a work center and fluid operated means therefor comprising a cylinder, a piston therein and a rod connected to said piston and said center, means for permitting the passage of fluid to and from the rear of said piston, means for permitting the passage of fluid to and from the front of said piston, a tool carriage and means controlled by the motion of said carriage to reverse the direction of flow of fluid into and out of the opposite ends of said cylinder.

4. In a machine of the class described, a work driving spindle, a bearing therefor, a pair of cylinders, a tool carriage, a work center, a piston and a piston rod in one of said cylinders connected to said carriage, a piston and a piston rod in the other of said cylinders connected to said work center, a pair of rods each passing through openings in projections on said bearing and said cylinders respectively, means for supplying fluid pressure behind said pistons to force said center and said carriage toward said work driver, and means on the ends of said pair of rods to prevent relative longitudinal motion between said cylinders and the said bearing.

5. In a machine of the class described, a movable tool carriage, a movable work center, a piston connected to said carriage, a piston connected to said center and means to supply fluid pressure behind said pistons, constructed and arranged so that said center is first moved and held against the work, and afterward said carriage is moved along the work.

6. In a machine of the class described, a movable tool carriage, a movable work center, a pair of cylinders in alinement, a piston in each of said cylinders, one of said pistons being connected to said carriage and the other to said center, and means for supplying a fluid behind each of said pistons.

7. In a machine of the class described, a movable tool carriage, a movable work center, a pair of cylinders, a piston in each of said cylinders, one of said pistons being connected to said carriage and the other to said center, pipes connecting the rear of each of said cylinders with a source of fluid pressure, an outlet pipe connected to the front of the carriage cylinder, means for regulating the flow of fluid through said outlet pipe and means, controlled by the motion of said carriage, to supply fluid pressure to the front of each of said cylinders.

8. In a machine of the class described, a movable tool carriage, a movable work center, a pair of cylinders, a piston in each of said cylinders, one of said pistons being connected to said carriage and the other to said center, pipes connecting the rear of each of said cylinders with a source of fluid pressure, an outlet pipe connected to the front of the carriage cylinder, means for regulating the flow of fluid through said outlet pipe, a carriage reversing pipe connected to the front of the carriage cylinder, a center reversing pipe connected to the front of the work center cylinder, valves to admit fluid pressure through said pipes connected to the rear of said cylinder to move said work center against the work and said carriage along the same, valves to admit fluid pressure through said pipes connected to the front of said cylinders, and operating means for said valves, constructed and arranged so that, when set in one position, said fluid pressure will move said work center toward and hold it against the work and move said carriage along the work, and when set in another position, said work center will be moved away from the work and the motion of said carriage be reversed.

9. In a machine of the class described, a movable tool carriage, a movable work center, a pair of cylinders, a piston in each of said cylinders, one of said pistons being connected to said carriage and the other to said center, pipes connecting the rear of each of said cylinders with a source of fluid pressure, an outlet pipe connected to the front of the carriage cylinder, means for regulating the flow of fluid through said outlet pipe, a carriage reversing pipe connected to the front of the carriage cylinder, a center reversing pipe connected to the front of the work center cylinder, valves to admit fluid pressure through said pipes connected to the rear of said cylinder to move said work center against the work and said carriage along the same, valves to admit fluid pressure through said pipe connected to the front of said cylinders, operating means for said valves, constructed and arranged so that, when set in one position, said fluid pressure will move said work center toward and hold it against the work and move said carriage along the work, and when set in another position, said work center will be moved away from the work and the motion of said carriage be reversed, and means, controlled by the motion of said carriage, to operate said operating means.

10. In a machine of the class described, a pair of parallel rods, a tool carriage, and a pair of capped bearings formed integral with said carriage, and adapted to engage said rods with the solid portion of one of said bearings above one of said rods and the solid portion of the other below the other of said rods.

11. In a machine of the class described, a pair of parallel ways, a tool carriage having bearings formed integral therewith and adapted to engage said ways with one of said bearings above one of said ways and the other of said bearings below the other of said ways, said bearings being provided with members to hold said carriage on said ways.

GEORGE DE LAVAL.

Witnesses:
JULIA V. WALLING,
M. E. REGAN.